United States Patent Office 3,423,031
Patented Jan. 21, 1969

3,423,031
METHOD AND APPARATUS FOR CONTINUOUSLY REFINING COCOA NIBS AND LIKE MATERIAL
Herbert Alfred Merges, 1 Werkstrasse, 6456 Wolfgang, near Hanau, Germany, and Josef Pasteka, am Laubersberg 19, Steinheim (Main), Germany
Filed Aug. 2, 1966, Ser. No. 569,665
Claims priority, application Germany, Aug. 5, 1965,
U 11,944
U.S. Cl. 241—8        9 Claims
Int. Cl. B02c *13/09, 19/06*

ABSTRACT OF THE DISCLOSURE

A cocoa nib paste free of excess moisture, acids and malodorous components is prepared by forming a ring of broken cocoa nib and air, beating the cocoa nib in the presence of a large volumetric excess of air to form a mixture of the cocoa nib mass dispersed in the air, driving this mixture toward a perforated plate whereon the coarser particles are retained, while another mixture of fine particles and air pass through the plate, expanding the mixture passed through the plate, which contains the finer particles, moisture, acidic taste particles and malodorous substances extracted from the cocoa nib mass, and separating the air loaded with the moisture, acidic taste particles and malodorous substance from the finer particles.

---

This invention relates to the comminuting and refining of material mainly consisting of cocoa-nib constituents, such as the mass obtained by roasting, crushing and winnowing cocoa beans, and chocolate compositions prepared from such a mass.

It is conventional to grind the mass of cocoa kernels between rollers or rotating stones to prepare it for removal of cocoa butter and recovery of cocoa powder, or for further processing into chocolate. The known refining devices have a relatively small output if the cocoa paste is to be reduced to very small particles. Moreover, the paste obtained must be aerated in tumbling barrels or other equipment in order to remove excessive moisture, acids and undesirable, odor-producing components.

It is an object of the invention to provide a method of refining cocoa nibs and similar material at a high rate to a paste whose solid constituents have extremely small particles size, and in a single operation in which excess moisture, acids and malodorous components are also removed.

Another object is the provision of equipment for performing the method.

Figure 1:
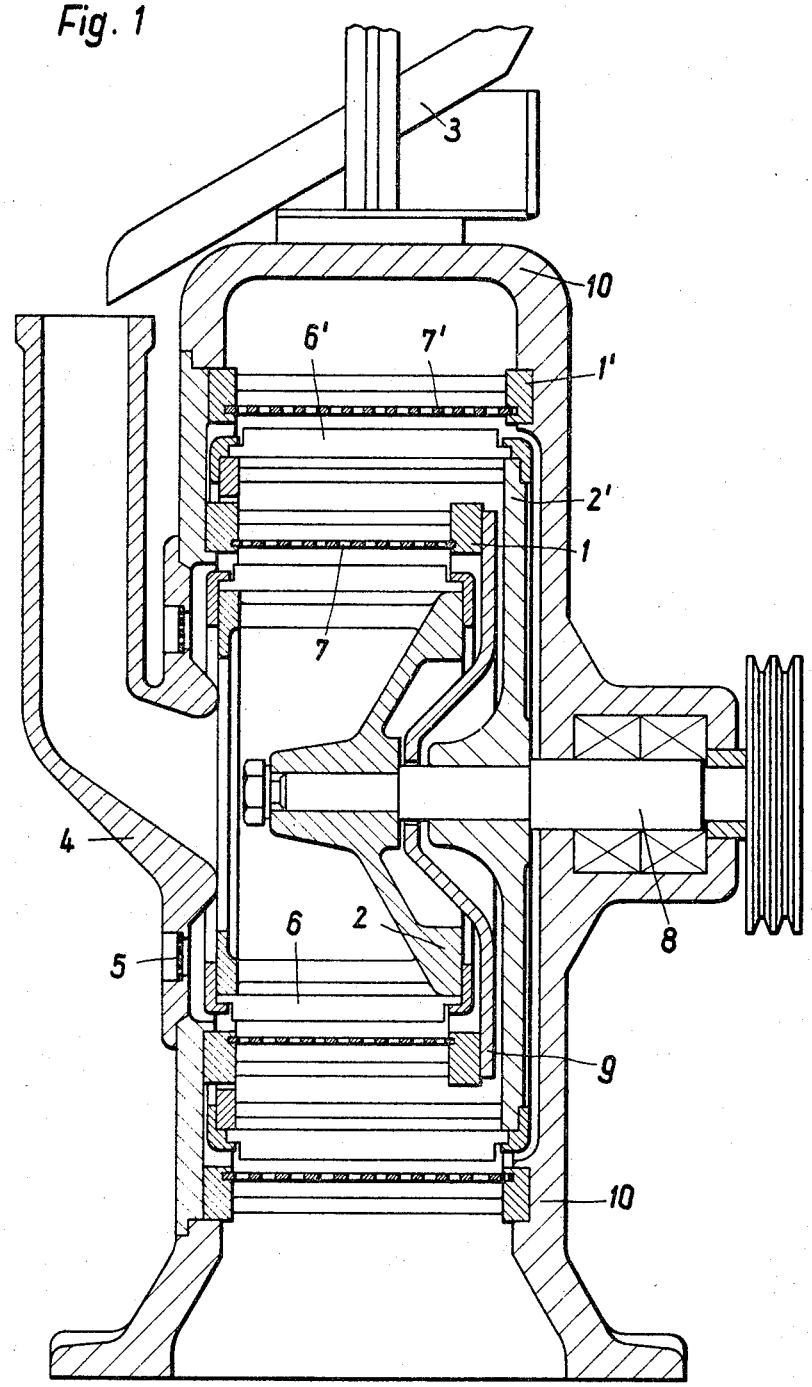
Figure 2:
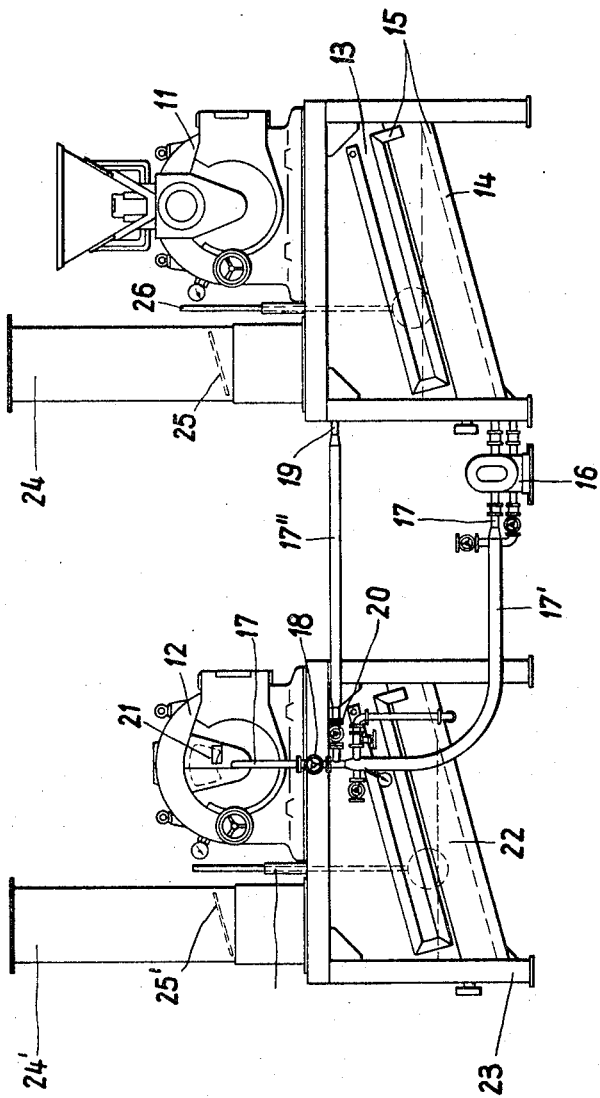
Figure 3:
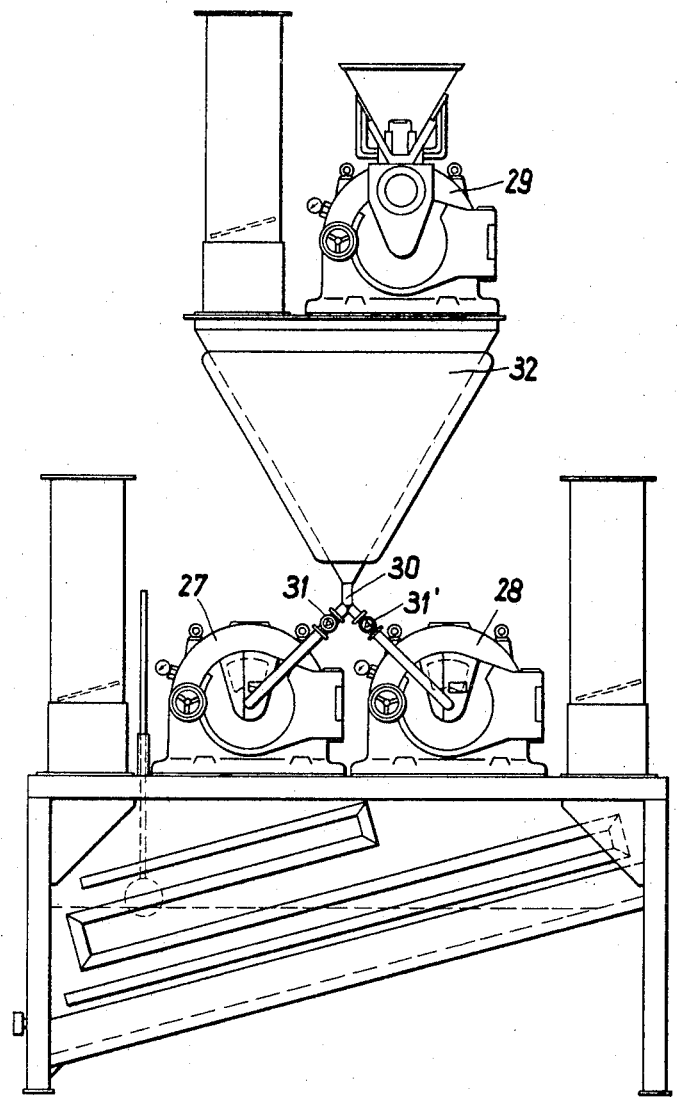

Other objects and many of the attendant advantages of this invention will become apparent from the following description of preferred embodiments when considered with the appended drawing in which:

FIG. 1 shows the disintegrator portion of refining apparatus according to this invention in elevational section; and FIGS. 2 and 3 respectively illustrate two modified examples of refining apparatus.

Referring initially to FIG. 1, there is seen a rotary disintegrator in whose stationary casing 10 a horizontal drive shaft 8 is journaled. The cavity of the casing 10 is radially divided into two portions by a stationary perforated plate 7 which is cylindrical about the axis of the shaft 8 and provided with a reinforcing frame 1. The free end of the shaft 8 in the central cavity portion carries an approximately conical rotor element 2 on which a set of axially elongated beater blades 6 are mounted in circumferentially spaced relationship like the vanes of a turbo-blower. The ends of the blades 6 remote from the rotor element 2 are rigidly connected by a ring coaxial with the shaft 8 to form a first rotor basket with the element 2.

A rotor plate 2' is mounted on the shaft 8 in a part of the casing cavity which is axially divided from the path of the first rotor basket by a partition plate 9 attached to the perforated plate 7.

The portion of the casing cavity radially outside the plate 7 is subdivided into two compartments by another cylindrical perforated plate 7', coaxial with the plate 7 and fixedly mounted on the casing 10 in a reinforcing frame 1'. The periphery of the rotor plate 2' extends into the radially inner one of the two compartments which is radially bounded by the two perforated plates 7, 7'. A set of beater blades 6', axially longer than the blades 6 but otherwise closely similar, are mounted in the inner compartment, and their free ends are connected by a ring to form a second rotor basket.

A conventional, rotary metering feeder, of which only the shell 4 is seen in FIG. 1, extends vertically upward from an axial orifice in the casing 10 adjacent the apex of the conical rotor element 2. A bin, of which only a chute is visible in the drawing, supplies the material to be ground to the open top of the feeder 4. Screened openings 5 in the casing 10 axially connect the ambient atmosphere with the space within the first rotor basket 2, 6. Air may flow from this space to the interior of the second rotor basket through a channel between the rotor element 2 and the partition plate 9, through an annular gap in the plate 9 about the shaft 8, through a channel between the plate 9 and the plate 2', and axially into the second rotor basket.

The radially outermost annular compartment of the casing cavity is downwardly open and normally sealed to a vented expansion chamber in a manner more fully illustrated in FIGS. 2 and 3. The casing 10 and the feeder pipe 4 may be jacketed in a known manner to maintain the processed material at a desired temperature by heat exchange with a cooling or heating fluid where contact of the metallic walls of the casing 10 and the pipe 4 with the ambient air is not adequate for the same purpose.

A refining apparatus of the invention using two disintegrating units 11, 12 is more fully illustrated in FIG. 2. The units 11, 12 are closely similar and differ from that shown in FIG. 1 by having only one rotor basket and only one stationary perforated plate each. Air is admitted to the space within each rotor basket through screened ports 21 in the respective casings.

Disintegrated material drops from the unit 11 into an expansion chamber 13 equipped with an obliquely sloping bottom 14. A heating and cooling 15 in the chamber 13 is alternatingly supplied with steam and cooling water in a conventional manner to maintain a desired temperature which is controlled and indicated by a nonillustrated thermometer. The level of material in the chamber 13 is indicated by a float and gage 26. A wide stack 24 vents the expansion chamber to the atmosphere, and the effective flow section of the stack 24 may be controlled by a damper plate 25.

The lowermost portion of the chamber 13 is connected with the axial intake orifice of the unit 12 by a constant output pump 16 and a pipe 17 equipped with a heating jacket 17'. The rate of material flow from the pump 16 into the unit 12 is controlled by a valve 18, the excess pump output being returned to the chamber 13 by a return pipe 19, also provided with a jacket 17" and with a valve 20 which is never fully closed during normal operation of the apparatus.

The unit 12 discharges processed material into an expansion chamber 22 in which a constant temperature is maintained by a nonillustrated indicated and controlling thermometer. The level of the material is indicated by a gage 26', and air is vented from the chamber 22 through a stack 24' at a rate controlled by a damper 25' in substantially the same manner as described with reference to the chamber 13. The product is withdrawn from the deepest portion 23 of the chamber 22.

Yet another cocoa refining apparatus according to the invention is shown in FIG. 3. It consists of a two-stage disintegrating unit 29 identical with that illustrated in FIG. 1, and with two single-stage units 27, 28 of the type described with reference to FIG. 2, the unit 29 being mounted above the units 27, 28. Material processed in the unit 29 thus drops into a stack-equipped expansion chamber 32, and flows from the lowermost portion of the latter by gravity through a Y-fitting 30 and respective valved pipes 31, 31' into the units 27, 28. A common expansion chamber receives the output of the units 27, 28.

The apparatus partly illustrated in FIG. 1 is operated as follows:

A belt trained over a pulley on the shaft 8 rotates the two rotor baskets at a high speed. The axially elongated blades 6, 6' draw air through the screened openings 5, drive the air through the narrow perforations in the plates 7, 7', and out of the casing into the wide expansion chamber, not shown in FIG. 1, for discharge through the associated stack.

The temperature of the mass of cocoa nibs which are to be ground, and which additionally may contain sugar and flavoring ingredients if a chocolate mixture is to be prepared, is fed into the rapidly circulating air stream within the inner or first rotor basket by the feeder 4 and is broken up by the combined effects of the air and of the beating blades 6. A fluid dispersed mixture or suspension of cocoa nib constituents and air is formed in the central portion of the casing 10. The feeding rate and the rotor speed are balanced in such a manner as to maintain an annular body of the suspension on the inner face of the plate 7, and to keep this body thick enough so that the blades 6 whip through the material, and break solid particles. The suspension is subjected to intensive shear stresses not only by the blades 6, but also by the rapidly rotating air stream within the rotor basket, and by the stationary perforated plate 7 which tends to retard rotary movement of the annular mass. Axial corrugations in the plates 7, 7' have been found to increase the shearing effect but are not always required, and smoothly cylindrical plates of the type illustrated are often sufficient.

The plate 7 retains coarse particles, but there is no simple relationship between the size of the dispersed particles in the dispersion driven through the plate 7 and the dimensions of the perforations. The largest passing particles are much smaller than the perforations at high rotor speed.

The refining process is repeated in the second disintegrating stage between the plates 7, 7'. When the inner face of the plate 7 is covered by a continuous fluid mixture of air and cocoa material, a stream of secondary air flows from the first rotor basket through the channels around the partition plate 9 into the second rotor basket to feed the rotating body of air in the second stage, and for further admixture of the cocoa material so that the fluid mixture driven radially outwardly through the perforations in the plate 7' is richer in air than that passing the plate 7. Its dispersed particles also are substantially smaller.

The pressure in the nonillustrated expansion chamber associated with the unit shown in FIG. 1 is lower than that within the casing cavity, and most of the air is released from the dispersion and vented to the atmosphere. It takes with it those volatile constituents of the cocoa nibs which are not retained by the cocoa butter, that is, the excess moisture, the acids and the undesirable odor components. Under normal operating conditions, the volume ratio of the cocoa mass fed to the unit and of the air drawn into the unit through the openings 5 is of the order of 1:5,000 or even less, and the large volumetric excess of air is essential not only for the removal of volatile impurities but also for the refinement of particle size.

The temperature within the casing 10 is held relatively low even without external cooling by the large amounts of atmospheric air which are being contacted with the cocoa mass, but the desired operating temperature may be maintained in the casing 10 by jacketing its walls and passing heating or cooling fluid through the jacket. A temperature of about 45° C. is preferred in the first stage when fully roasted cocoa beans are processed, and the optimum temperature in the second stage is preferably slightly higher, a value of 47° C. being typical. A liquid product is discharged from the casing 10 under these conditions.

Nibs obtained from lightly roasted beans may be disintegrated in the first stage at about 47° C., and at 49° C. in the second stage for best results. Even if a slightly acidic taste component can still be detected in the material discharged from the first stage, the characteristic bitter taste of cocoa is fully developed after the second stage, and is entirely free of the acidic component. Material from fully roasted beans is free of acid already after the first stage, and the product obtained in the second stage is ready for extraction of cocoa butter and recovery of cocoa powder without the conventional neutralization with potassium carbonate.

If the material fed to the disintegrating unit is premixed with cocoa butter, powdered sugar, milk solids and other conventional ingredients of chocolate compositions, there is obtained a fluid chocolate mass that may be directly cast into tablets.

The precise nature of the dispersed mixture which forms annular bodies on the inner faces of the plates 7, 7' could not be determined. The material flowing radially outwardly from the perforations in the plates has the characteristics of a fog-like suspension of fine liquid or semi-solid particles in air.

The apparatus of the invention shown in FIGS. 2 and 3 operates in a manner closely similar to that of the apparatus partly shown in FIG. 1, and more fully discussed above.

The jackets 17', 17" maintain the necessary fluidity in the mass which is being transferred from the first-stage unit 11 to the second-stage unit 12 by the pump 16, and clogging of the pipe 17 is further prevented by the relatively high flow rate maintained by the pump 16 whose output is partly returned to the expansion chamber 13.

The ratio of air to cocoa nib constituents is approximately twice as high in the units 27, 28 than in the unit 29 shown in FIG. 3, the three units drawing approximately equal amounts of air, but the third-stage units 27, 28 each receiving only one-half of the output of the unit 29.

A unit of the type shown in FIG. 1 having a rotor diameter of 350 millimeters (about 14 in.) and other dimensions evident from the drawing has a capacity of about 500 kg. of cocoa nibs per hour at a rotor speed of 2,500 to 3,500 r.p.m. It draws approximately 40 cubic meters of air per hour so that the flow rates of cocoa mass and air are approximately 0.14 liter per second and 665 liters per second. The velocity of the mixture discharged from the screen 7' is sufficient to hold the finely divided particles of cocoa constituents suspended in the air stream, but the flow velocity is sharply reduced in the expansion chamber so that the cocoa particles settle and separate from the conveying and suspending air. The particle size of the settling material is approximately 25 to 30 microns.

When a chocolate composition low in cocoa butter is processed in the apparatus of FIG. 3, the total amount of air contacted with the chocolate mass is so high that the air may have to be preheated before being admitted to the units 27, 28, 29 if the units have the dimensions described above and are operated at a rotary speed of 2,500 to 3,000 r.p.m. It will be appreciated that only 0.07 liter of chocolate composition are contacted with 665 liters of fresh air in each of the units 27, 28 and that the air, if not preheated, may reduce the temperature of the mass below its melting point.

It should be understood, of course, that the foregoing disclosure relates only to preferred embodiments of the invention, and that it is intended to cover all changes and modifications of the examples of the invention chosen for the purpose of the disclosure which do not constitute departures from the spirit and scope of the invention set forth in the appended claims.

We claim:
1. A method of continuously refining a mass mainly consisting of cocoa-nib constituents which comprises:
   (a) feeding said mass in turn into at least two streams of air,
   (b) centrifugally leading said streams of air to at least one beating zone;
   (c) forming a ring of said mass consisting of broken cocoa-nib and air in said beating zone;
   (d) beating said mass in said beating zone in the presence of a large volumetric excess of air to form a mixture essentially consisting of said mass dispersed in said air;
   (e) driving said mixture from said beating zone toward a perforated plate member, whereby relatively coarse particles of said mixture are retained in said beating zone, and another mixture of finer particles and air pass through the perforations in said plate member;
   (f) expanding said air passed through said perforated plate member and containing said finer particles, moisture, acidic taste particles and malodorous substances extracted from said cocoa-nib mass; and
   (g) separating said air loaded with said moisture, acidic taste particles and malodorous substances from said finer particles.

2. A method as set forth in claim 1, wherein the portion of said mass passed through said plate member is beaten in a second beating zone in the presence of a large volumetric excess of air; and driving said other mixture from said second beating zone toward a second perforated plate member, whereby a portion of said other mixture passes through the perforations of said second plate member before the air is separated.

3. A method as set forth in claim 2, wherein air is introduced into each of said beating zones in a direction transverse to the direction of movement of the respective suspension toward the associated perforated plate member.

4. A method as set forth in claim 3, wherein each beating zone has an axis, said mass is beaten by beating elements moving in arcuate paths about said axis relative to the associated plate member, whereby said mass is rotated about said axis by the beating elements, and its rotary movement is impeded by the perforated plate member and the mass is subjected to shear stress.

5. A method as set forth in claim 4, wherein the volumetric excess of air in said second beating zone is substantially greater than in said first beating zone.

6. A method as set forth in claim 5, wherein the ratio of air to said mass in said second beating zone is substantially twice the ratio in said first beating zone.

7. A refining apparatus for cocoa nibs and like material comprising, in combination:
   (a) a casing having an axis and defining a cavity therein;
   (b) a perforated plate member dividing said cavity into a first portion adjacent said axis and a second portion radially spaced from said first portion in a direction away from said axis;
   (c) a rotor mounted in said first portion for rotation about said axis, said rotor including a set of beating elements circumferentially spaced about said axis for movement in an arcuate path near said perforated plate member;
   (d) feeding means for feeding a continuous stream of the material to be refined to said first portion of said cavity in a predetermined path;
   (e) aerating means for admitting a stream of gas to said first portion in a path spaced from said predetermined path,
      (1) whereby said gas and said material are beaten into a mixture by said beating elements in said first portion of the cavity when said rotor rotates about said axis at high speed, and said mixture is driven by centrifugal forces through the perforations of said plate member into said second portion of said cavity;
   (f) an expansion chamber communicating with said second portion; and
   (g) venting means for releasing gas from said chamber, the flow section of said chamber transversely of the direction of flow therethrough from said second portion to said venting means being much greater than the combined flow sections of said perforation.

8. An apparatus as set forth in claim 7, further comprising another perforated plate member in said second portion of said cavity, said other plate member dividing said second portion into first and second compartments, said first compartment being contiguously adjacent said first-mentioned plate member, and said second compartment being offset from said first compartment in a direction radially away from said axis; another rotor member including another set of beating elements arranged in said first compartment for movement about said axis, whereby the mixture driven through the perforations of said first-mentioned plate member is received in said first compartment; and additional aerating means for admitting a stream of gas to said first compartment separately from the mixture being received in said first compartment, said expansion chamber communicating with said second compartment.

9. An apparatus as set forth in claim 7, further comprising temperature-control means for maintaining a substantially constant temperature in said expansion chamber.

References Cited

UNITED STATES PATENTS 1,934,180  11/1933  Fischer et al. _____ 241—55 X

FOREIGN PATENTS 482,178  4/1952  Canada.

JAMES M. MEISTER, *Primary Examiner.*

U.S. Cl. X.R.

241—49, 55